(12) United States Patent
Kitamura et al.

(10) Patent No.: US 7,298,573 B2
(45) Date of Patent: Nov. 20, 2007

(54) MAGNETIC DISK DRIVE WITH OFFSET DETECTION OF COMPOSITE MAGNETIC HEAD

(75) Inventors: Nobuhito Kitamura, Kanagawa (JP); Noriyuki Sumiya, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/304,203

(22) Filed: Dec. 14, 2005

(65) Prior Publication Data

US 2006/0126213 A1 Jun. 15, 2006

(30) Foreign Application Priority Data

Dec. 15, 2004 (JP) ............... 2004-362332

(51) Int. Cl.
*G11B 21/02* (2006.01)
*G11B 27/36* (2006.01)

(52) U.S. Cl. .......................... 360/75; 360/31
(58) Field of Classification Search ............... None
See application file for complete search history.

(56) References Cited

U.S. PATENT DOCUMENTS

| 6,021,024 | A | 2/2000 | Akiyama et al. |
|---|---|---|---|
| 6,268,983 | B1 | 7/2001 | Imada et al. |
| 6,476,992 | B1* | 11/2002 | Shimatani ............... 360/46 |
| 2004/0190174 | A1* | 9/2004 | Yoshida et al. ............ 360/51 |
| 2005/0002121 | A1* | 1/2005 | Allen et al. .............. 360/75 |
| 2005/0128632 | A1* | 6/2005 | Nakamura et al. ......... 360/75 |
| 2006/0056093 | A1* | 3/2006 | Ehrlich et al. ............ 360/75 |

FOREIGN PATENT DOCUMENTS

| JP | 05-081796 | 4/1993 |
|---|---|---|
| JP | 05-133974 | 5/1993 |
| JP | 06-187624 | 7/1994 |
| JP | 06-314479 | 11/1994 |
| JP | 2001-014606 | 1/2001 |
| JP | 2001-101633 | 4/2001 |
| JP | 2001-143412 | 5/2001 |

\* cited by examiner

*Primary Examiner*—Andrew L. Sniezek
(74) *Attorney, Agent, or Firm*—Townsend and Townsend and Crew LLP; Patrick Duncan

(57) ABSTRACT

Embodiments of the invention detect a head offset in a data region between servo regions in a data write operation. To detect a head offset even in a data region between servo regions, a magnetic disk drive according to an embodiment of the invention makes adjustments to maintain a fixed relative position between the write head and the read head and reads positional information embedded in certain data by use of the read head until just before writing data. This allows the magnetic disk drive to detect a head offset until just before writing data, leading to enhanced reliability.

14 Claims, 4 Drawing Sheets

(A)

(B)

(C)

MAGNETIC DISK DRIVE WITH OFFSET DETECTION OF COMPOSITE MAGNETIC HEAD

CROSS-REFERENCES TO RELATED APPLICATIONS

This application claims priority from Japanese Patent Application No. JP2004-362332, filed Dec. 15, 2004, the entire disclosure of which is incorporated herein by reference.

BACKGROUND OF THE INVENTION

The present invention relates to a magnetic disk drive having a composite magnetic head made up of a write head and a read head, and more particularly to a mechanism for, in a write operation, detecting a head offset even in a data region between servo regions.

The following procedure is used to write data in a magnetic disk drive employing a "data surface servo system" in which data recording regions and servo information regions are formed on the same magnetic disk medium. First, the magnetic disk drive positions the write head at the track that includes the sector to which to write the data. Then, the drive reads the servo information until the target sector is reached, thereby obtaining the disk radial position of the head. The drive then calculates the amount of displacement between the ideal radial position and the current radial position (hereinafter referred to as the offset amount) and if it exceeds a predetermined threshold value, the drive does not write the data to the sector. If, on the other hand, the offset amount is within the threshold value, the drive writes the data to the sector. Furthermore, after writing the data, the drive obtains an offset amount from the next servo information and determines whether it is within a predetermined threshold value, as in the above. If the offset amount is within the threshold value, the magnetic disk drive determines that it has been able to write the data to the proper position. If, on the other hand, the offset amount exceeds the threshold value, the magnetic disk drive determines that it has not been able to write the data to the proper position and hence performs processing for rewriting the data.

Thus, the conventional magnetic disk drive writes data to the disk without detecting the head offset amount in the data recording regions between servo information regions. This means that even when a head offset has occurred within a data recording region, the magnetic disk drive writes data without correcting the head position until it reaches the next servo information. In such a case, the data is not written to the proper position on the target tack, and data on an adjacent track(s) may be lost. If this happens, the drive cannot properly read data from the adjacent track(s). Further, assume that a head offset occurred in a data recording region but the head has returned to the proper position when it has reached the next servo information region. In such a case, the drive erroneously determines that the data has been properly written. This leads to an inability to read the proper data in a data read operation.

Various techniques have been used to prevent data from being written when a head offset has occurred in a data recording region. For example, when servo information obtained right after a data write operation to a data recording region indicates that a head offset has occurred between the current and previous servo information regions, the technique disclosed in Patent Document 1 (Japanese Patent Laid-Open No. 2001-14606) determines the offset direction based on the servo information and performs processing to prevent loss of data from the track on the offset side of the current track. Further, the technique disclosed in Patent Document 2 (Japanese Patent Laid-Open No. 05-133974 (1993)) detects external shock by using an acceleration sensor, and upon detecting a shock, this technique stops the current data write operation, since a head offset may have occurred in a data recording region (between servo regions), thereby increasing the data writing reliability.

BRIEF SUMMARY OF THE INVENTION

The technique of Patent Document 1 is only a recovery technique used when data has been written with an offset, and is not useful in the case of a head offset in a data recording region if there is no head offset between the servo regions adjacent to the data recording region. As for the technique of Patent Document 2, it is useful in preventing data from being written when a head offset has occurred due to an external shock. However, this technique cannot be applied to head offsets caused by other factors such as an overshoot due to a seek operation between tracks.

In contrast with the above conventional techniques, the present invention can detect a head offset in a data recording region (between servo regions) caused by a factor other than an external shock, thereby enhancing data writing reliability.

According to an aspect of the present invention, a magnetic disk drive includes, or embeds, positional information in data to be written to each track. Furthermore, the magnetic disk drive adjusts the positional relationship between the write head and the read head in a disk radial direction by use of a two-stage actuator using a piezoelectric element, etc. capable of such adjustment. Specifically, in a data write operation, the read head is positioned approximately over the center of the same track at which the write head is positioned, or over the center of another track. In this state, the magnetic disk drive reads positional information written in data recording regions by use of the read head and detects head offsets in these data recording regions (between servo regions) based on the positional information until just before it begins writing data. The magnetic disk drive then controls the data write operation based on the offset amount detected in the data recording regions (between servo regions).

The present invention allows a magnetic disk drive to detect head offsets in data regions (between servo regions) until just before it starts writing data, thereby enhancing reliability.

BRIEF DESCRIPTION OF THE DRAWINGS

FIGS. 3(A) to 3(C), shows an example (an exemplary head arrangement) according to the present invention.

DETAILED DESCRIPTION OF THE INVENTION

Figure 4:
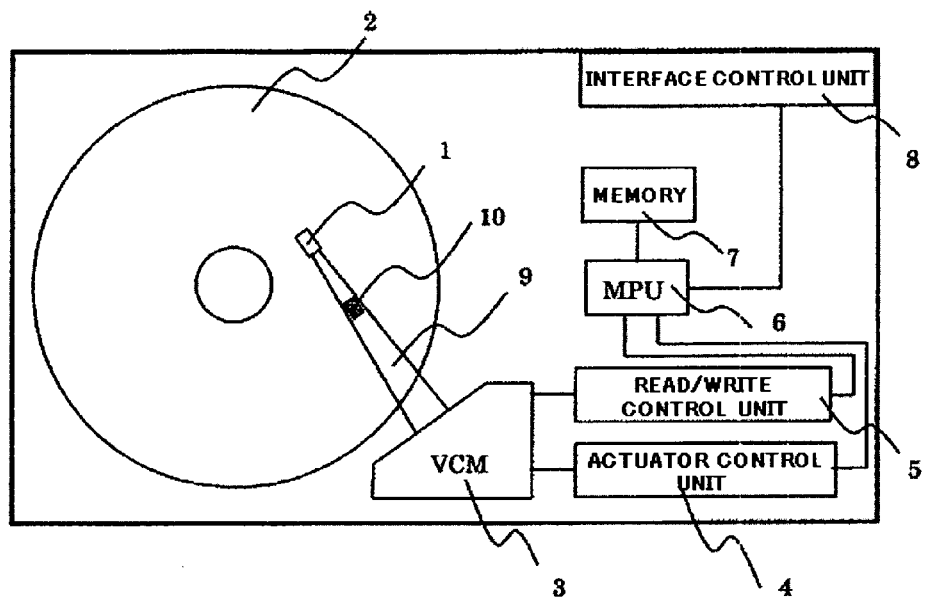
FIG. 4 shows the system configuration of a magnetic disk drive according to an embodiment of the present invention.

An embodiment of the present invention will be described below. FIG. 4 is a diagram showing the system configuration of a magnetic disk drive according to the embodiment. The magnetic disk drive comprises: a disk 2 for storing data; a read/write head (assembly) 1 for writing/reading data to/from the disk 2; a head support mechanism 9 for holding the read/write head 1; and a VCM 3 for moving the head support mechanism 9 around a pivot point (not shown). The head support mechanism 9 includes a microactuator unit 10 for finely controlling the movement of the read/write head 1. The microactuator unit 10 and the VCM 3 constitute a two-stage actuator. A piezoelectric element may be used as the microactuator unit 10. An actuator control unit 4 controls the operation of the VCM 3 and the microactuator unit 10 to move the write/read head 1 to a given position with high precision. Upon receiving a write command from the host device (not shown) through an interface control unit 8, a read/write control unit 5 performs processing for scrambling or encoding the write data. Upon receiving a read command, on the other hand, the read/write control unit 5 performs processing for demodulating the read data from the read/write head 1.

Figure 5:
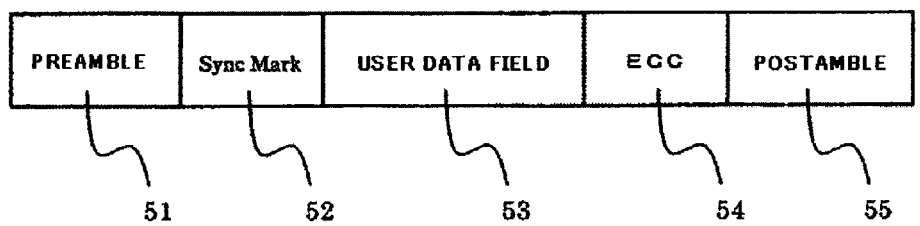
FIG. 5 shows the recording format of a data sector of the embodiment.

FIG. 5 shows an exemplary write data format of the data written to each sector on the disk 2. The write data format includes: a preamble field 51 used for pull-in operation of a PLL (Phase Locked Loop) circuit (not shown); a Sync mark 52 which is a synchronization signal for, in a read operation, obtaining a timing signal to demodulate modulated code after detecting the start position of a data field 53; the data field 53 to which user data is written or from which user data is read; an ECC 54 for error detection or correction; and a postamble 55 used for signal processing for PRML (Partial Response Maximum Likelihood), etc.

Figure 1:
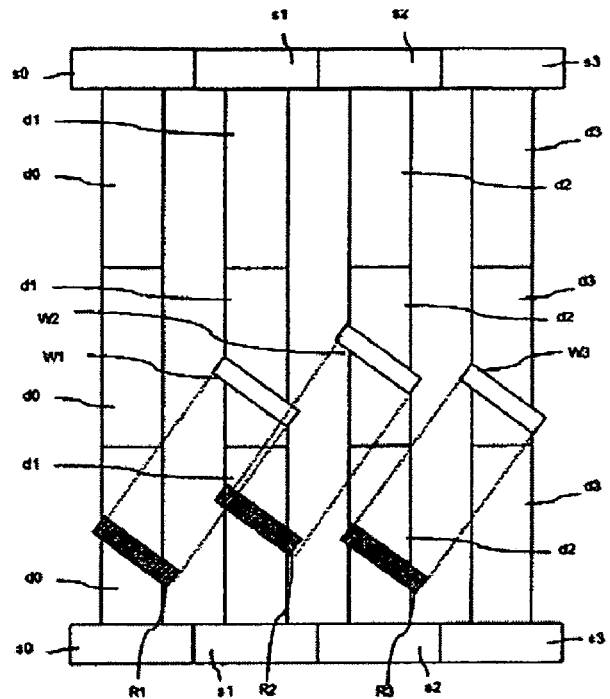
FIG. 1 shows the positional relationship between a write head and a read head according to an embodiment of the present invention.
Figure 2:
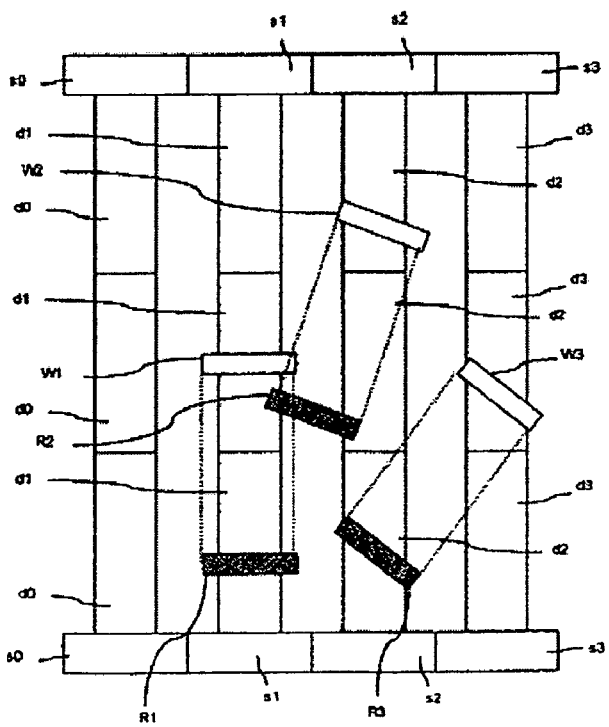
FIG. 2 shows the positional relationship between a conventional write head and a conventional read head.

FIG. 1 shows the positional relationship between the write head and read head of the present embodiment over the disk 2, while FIG. 2 shows the positional relationship between a conventional write head and read head over the disk 2. The write/read head 1 includes: a slider; a read head R laminated onto the end surface of the slider; and a write head W laminated onto the read head R.

Referring to FIGS. 1 and 2, reference numerals s0 and d0 denote a servo region and a data region of a track 0, respectively. Likewise, s1 to s3 denote servo regions of tracks 1 to 3, respectively, while d1 to d3 denote data regions of the tracks 1 to 3, respectively. Reference characters W1 and R1 indicate the write and read heads, respectively, when data is written to the track 1. Likewise, W2 and R2 indicate the write and read heads when data is written to the track 2, and W3 and R3 indicate the write and read heads when data is written to the track 3.

Figure 6:
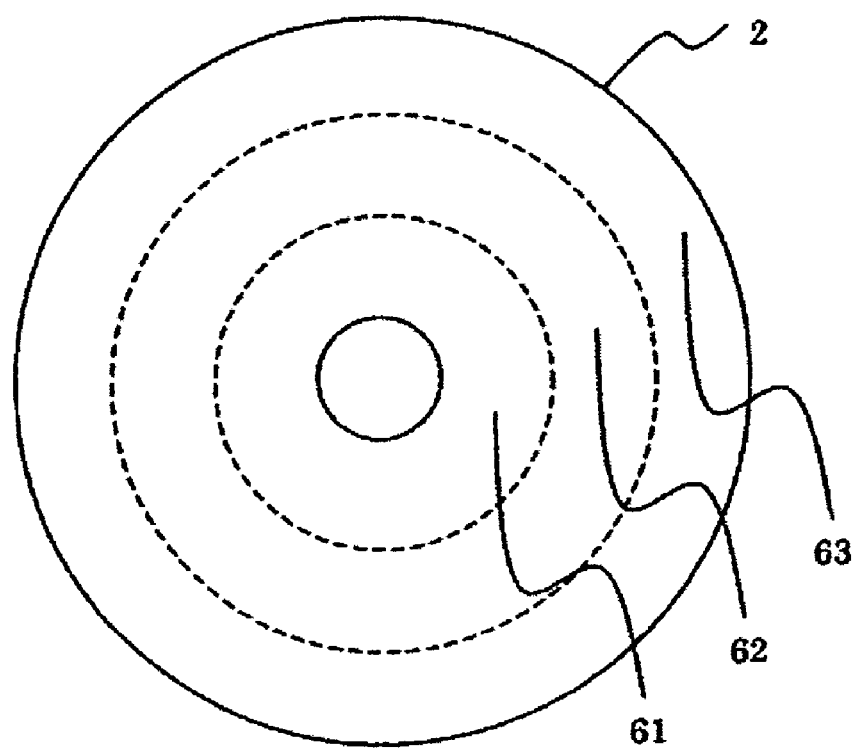
FIG. 6 shows track regions according to the embodiment.

In the example shown in FIG. 2, when the write head is located over the center of the track 1, the read head is also located over the center of the track 1, as indicated by W1 and R1. When the write head is moved to the center of the track 2 by action of the actuator, however, the read head is moved to a position near the intermediate position between the tracks 1 and 2, as indicated by W2 and R2. Further, when the head support mechanism 9 is rotated such that the write head is moved to the center of the track 3, the read head is moved to the center of the track 2, as indicated by W3 and R3. Thus, with conventional composite magnetic heads made up of a write head and a read head, the positional relationship between the write and read heads varies depending on their radial positions on the disk 2. This means that even when the write head is located over the center of a given tack for a data write operation, the read head may not necessarily be located over the center of any track. To address this problem, the magnetic disk drive of the present embodiment uses the two-stage actuator including the microactuator unit 10 (a piezoelectric element, etc.) to adjust the composite head such that when the write head is positioned over a given track for a data write operation, the read head is positioned over the same track or another track. In the example shown in FIG. 1, the positional relationship between the write and read heads is adjusted by the two-stage actuator such that: when the write head is located over the track 1, the read head is located over the track 0, as indicated by W1 and R1 in the figure; and when the write head is located over the track 2, the read head is located over the track 1, as indicated by W2 and R2. This positional relationship is stored in a memory 7. In the example shown in FIG. 1, the positional relationship between the write and read heads is adjusted such that they are always positioned over adjacent tracks. However, the present embodiment is not limited to this particular positional relationship. The write and read heads may be always spaced N tracks apart (where N is an integer). Further, according to the present embodiment, the tracks may be grouped into a plurality of track regions, and the positional relationship between the write and read heads may be changed for each track region. For example, as shown in FIG. 6, the write and read heads may be spaced such that: in the innermost track region 61 of the disk 2, they are −M tracks apart (where M is a positive integer); in the outermost track region 63, they are M tracks apart; and in the track region 62 in between, they are positioned over the same track, that is, the skew angle (defined as the angle between the line connecting the centers of the write and read heads and a normal line of the disk 2) is substantially zero. In this case, the memory 7 stores the positional relationship between the write head W and the read head R on a track region basis. This arrangement allows the movement and control of the microactuator unit 10 to be reduced as a whole, which speeds up the positioning operation.

Further, the magnetic disk drive of the present embodiment includes, or embeds, positional information in data to be written to each track. For example, such positional information may be embedded in a pattern used to scramble (or encrypt) data to be written to the user data field 53, or it may be embedded in the pattern of the Sync mark 52.

Figure 3:
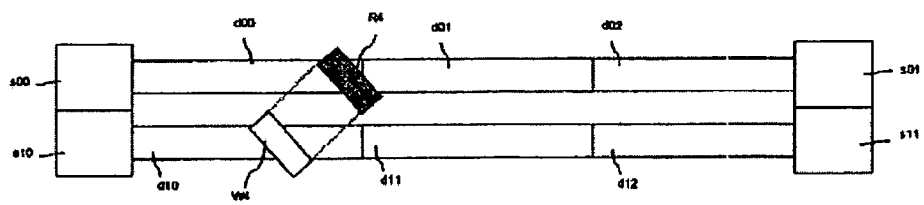
FIG. 3, which includes
Figure 3:
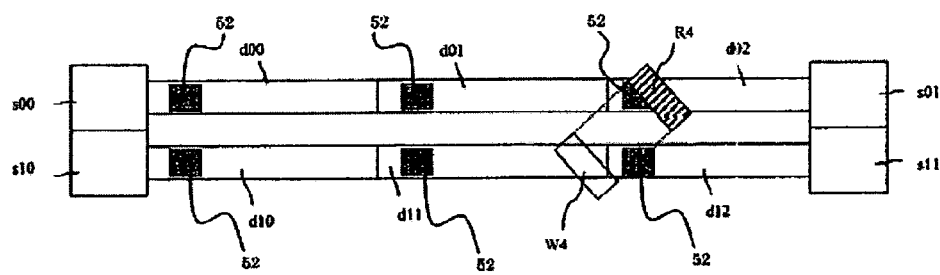
Figure 3:
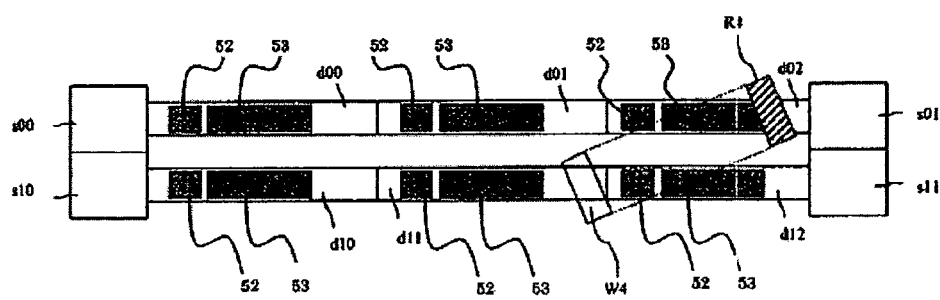

With reference to FIG. 3, a description will be given below of a method for writing data when the positional relationship between the write and read heads are set as described above. Reference characters s00 and s01 denote servo regions of the track 0, while d00, d01, and d02 denote data sectors on the track 0. Likewise, s10 and s11 denote servo regions of the track 1, while d10, d11, and d12 denote data sectors on track 1. The disk 2 rotates in such a direction that the write/read head 1 moves from the servo region s00 side to the servo region s01 side, as shown in FIGS. 2 and 3. The outer circumferential side of the disk 2 corresponds to the upper side of FIG. 3, while the inner circumferential side of the disk 2 corresponds to the lower side of FIG. 3. For simplicity, the following assumptions are made: when the write head is located over the track 1, the read head is located over the track 0, as indicated by W4 and R4; each Sync mark 52 on the track 0 is pattern A, that on the track 1 is pattern B, and that on the subsequent track is pattern C; and these Sync mark patterns A, B, and C are sequentially repeated through all tracks.

A description will be given below of a process of writing to the data sector d12 on the track 1. First of all, upon receiving an instruction to write data to the track 1, the magnetic disk drive calculates the amount of adjustment required to establish a desired positional relationship between the read head and the write head indicated by R4 and W4 by use of an MPU 6 based on positional information stored in the memory 7. Based on the calculation results, the drive controls the positional relationship between the read head (R4) and write head (W4) in a disk radial direction by use of the two-stage actuator, etc. As a result, the write head (W4) is positioned over the track 1 and the read head (R4) is positioned over the track 0. As shown in FIG. 3(A), the read head (R4) has passed over the data sectors d00 and d01 on the track 0 when the write head (W4) begins writing data to the data sector d12. When a conventional magnetic disk drive writes to the data sector d12, it cannot obtain any positional information after the servo region s00 until it reaches the servo region so1. This means that the magnetic disk drive cannot detect offsets of the write head (W4) which may occur in the data sectors d10 to d12. To address this problem, the magnetic disk drive of the present embodiment reads the data sectors d00 and d01 by use of the read head (R4) after reading the servo region s00 until it begins writing to the data sector d12. Then, the drive checks each Sync mark 52 in the read data. If it coincides with the pattern A, the read head (R4) is determined to be located over the track 0. This means that the write head (W4) is located over the track 1 as indicated by the positional information stored in the memory 7. If the Sync mark 52 is pattern B, however, the read head (R4) is determined to be located over the track 1, meaning that the write head (W4) is not located over the track 1 and is offset toward the inner circumferential side. Further, if the Sync mark 52 is pattern C, the read head (R4) is determined to be located over the track (not shown) on the outer circumferential side of the track 0, meaning that the write head (W4) is not located over the track 1 and is offset toward the outer circumferential side. Therefore, if the Sync mark is pattern A, the magnetic disk drive writes data to the data sector d12; if it is pattern B or C, or if no Sync mark 52 has been found, the drive performs no write operation since the write head (W4) is offset from the right position. The above determination process is performed by the MPU 6. It should be noted that the detection of the offset may be finely controlled by increasing or decreasing the threshold value for detecting the Sync mark 52. The above process allows a magnetic disk drive to detect a head offset in each data sector (between servo regions). Conventional processes cannot detect such a head offset since no positional information on the write and read heads in data sectors is available to them. It should be noted that the threshold value used to detect each Sync mark 52 is stored in the memory 7.

FIG. 3(B) shows the state of the write and read heads immediately before the magnetic disk drive writes data to the data sector d12 after reading a Sync mark 52 on the track 0 by use of the read head (R4) and checking for the occurrence of a head offset or checking whether the above conditions are satisfied. Whether the magnetic disk drive can start a write operation immediately after reading a Sync mark 52 depends on the length of the Sync mark 52, the last bit position, and the distance between the read head (R4) and the write head (W4). If the magnetic disk drive can start a write operation in this way, it is desirable that the drive determine the position (of the write head) based on the pattern of the Sync mark 52 and perform offset detection processing accordingly.

FIG. 3(C) shows the state of the write and read heads immediately before the magnetic disk drive writes data to the data sector d12 after reading the data in a user data field 53 on the track 0 by use of the read head (R4) and checking for the occurrence of a head offset or checking whether the above conditions are satisfied. Whether the magnetic disk drive can start a write operation immediately after reading the data in a user data field 53 depends on the length of the user data field 53, the last bit position, and the distance between the read head (R4) and the write head (W4). If the magnetic disk drive can start a write operation in this way, it is desirable that the drive determine the position of the write head based on the pattern used to scramble the data in the user data field 53 and perform offset detection processing accordingly. In this example, pattern AA, pattern BB, and pattern CC are used to scramble the data in the user data fields on the track 0, the track 1, and the subsequent track, respectively. The magnetic disk drive performs the same offset detection processing as that described in connection with FIG. 3(A).

According to the above description, the present embodiment detects a head offset by identifying the pattern of the Sync mark 52 in the data (shown in FIG. 5) stored in each data sector (between servo information regions) or identifying the pattern used to scramble the data in the user data field 53 in each data sector. However, the offset detection may be achieved by using another type of data or a combination of two types of data. In either case, the memory 7 stores information indicating which type or types of data should be used to detect a head offset.

Further according to the present embodiment, the read processing by the read head (R4) and the write processing by the write head (W4) are not simultaneously carried out. That is, the magnetic disk drive performs no read processing when it writes to the disk 2 after reading written data such as Sync marks 52. The reason for this is that if read processing and write processing are simultaneously carried out, the leakage field from the write head (W4) degrades the accuracy of the read processing by the read head (R4). However, they may be simultaneously carried out if no problem arises with the read/write head 1. Specifically, referring to FIG. 3(A), the read head (R4) continues to read the data written in the data sector d02 on the track 0 even when the write head (W4) begins and continues a write operation to the data sector d12. Therefore, the magnetic disk drive can detect the offset of the write head (W4) even while the write head (W4) is performing a write operation. The magnetic disk drive causes the write head (W4) to retry the write operation when it has detected a head offset or found that the above threshold value has been exceeded.

The present invention can be applied to magnetic disk drives having a composite magnetic head made up of a write head and a read head, allowing the drives to detect a head offset in data regions (between servo regions) in a write operation. Therefore, the present invention is useful in enhancing the reliability of magnetic disk drives.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising:
 a composite magnetic head including a write head and a read head; and
 an offset detecting unit configured, before initiation of a data write operation, to detect a head offset in a data region between servo regions based on data written in a data region between servo regions, said written data being read by said read head; and a memory for storing information indicating which type of data is to be used by said offset detecting unit to perform said detecting.

2. The magnetic disk drive as claimed in claim 1, wherein said offset detecting unit uses a pattern of a synchronization signal in said written data to perform said detecting.

3. The magnetic disk drive as claimed in claim 1, wherein said offset detecting unit uses a scrambling pattern to perform said detecting, said scrambling pattern being used to scramble user data in said written data.

4. The magnetic disk drive as claimed in claim 1, wherein said offset detecting unit uses pattern information related to a portion of said written data to perform said detecting.

5. The magnetic disk drive as claimed in claim 1, wherein said offset detecting unit uses pattern information related to multiple types of data contained in said written data to perform said detecting.

6. The magnetic disk drive as claimed in claim 1, further comprising:
a memory for storing information on a positional relationship between said write head and said read head in a write operation.

7. The magnetic disk drive as claimed in claim 6, wherein said positional relationship information is set for each predetermined track region.

8. A magnetic disk drive comprising:
a composite magnetic head including a write head and a read head; and
a processing unit configured, before initiation of a data write operation, to perform processing for detecting a head offset in a data region between servo regions based on data written in a data region between servo regions, said written data being read by said read head; and a memory for storing information indicating which type of data is to be used by said processing unit to perform said processing.

9. The magnetic disk drive as claimed in claim 8, wherein said processing unit uses a pattern of a synchronization signal in said written data to perform said processing.

10. The magnetic disk drive as claimed in claim 8, wherein processing unit uses a scrambling pattern to perform said processing, said scrambling pattern being used to scramble user data in said written data.

11. The magnetic disk drive as claimed in claim 8, wherein said processing unit uses pattern information related to a portion of said written data to perform said processing.

12. The magnetic disk drive as claimed in claim 8, wherein said processing unit uses pattern information related to multiple types of data contained in said written data to perform said processing.

13. The magnetic disk drive as claimed in claim 8, further comprising:
a memory for storing information on a positional relationship between said write head and said read head in a write operation.

14. The magnetic disk drive as claimed in claim 13, wherein said positional relationship information is set for each predetermined track region.

* * * * *